United States Patent Office 2,829,981
Patented Apr. 8, 1958

2,829,981
SURFACE MODIFIED SILICA GELS
Isadore Shapiro, Pasadena, Calif.
No Drawing. Application January 29, 1954
Serial No. 407,147
14 Claims. (Cl. 117—100)

The invention disclosed in this application for Letters Patent is subject to a non-exclusive, irrevocable, royalty-free license to the Government of the United States of America with power to grant licenses for all governmental purposes.

My invention relates to surface modified oxides and to a process for producing such surface modified oxides. More particularly, my invention relates to the modification of the surface of oxides of the gel type containing only bound water and to such modified products.

I have found that the bound water of oxides of the gel type, for example, silica gel, will react with diborane ($B_2H_6$) to produce surface modified products. Unlike the adsorbed water of gels such as silica gel, the bound water of these gels is chemically combined water and constitutes an integral part of the gel framework. The adsorbed water may be removed from the gel to leave only bound water in the gel by any suitable treatment, for example, by heating, by evacuating, or by desiccating with a suitable disiccant such as $P_2O_5$. This bound water is present in the gel in the form of hyroxyl ions, the bulk of which are located in the surface of the gel. The hydroxyl ions serve to partially hydrolyze borine ($BH_3$) formed by the dissociation of diborane when diborane is brought into contact with a gel containing only bound water. As the result of this hydrolysis reaction, new gel products are formed containing chemically bound boron in the form of partially hydrolyzed borine. The hydrolysis of the borine can be completed by exposing such a product to an excess of free water.

My invention expressed in terms of my new process for producing surface modified oxides of the gel type comprises treating the gel to remove all adsorbed water and thereafter contacting the gel containing only bound water with diborane to replace hydrogen atoms of hydroxyl groups of the original gel structure by —$BH_2$ radicals. My process may include the further steps of treating the surface modified oxide or gel, as by heating or exposing to water vapor, to effect further hydrolysis to convert at least a portion of the —$BH_2$ radicals to —$B(OH)_2$ radicals, and heating the surface modified oxide to a temperature of the order of about 500° to about 1000° C. to effect dehydration by removing hydrogen atoms and hydroxyl radicals of the modified gel structure as water. My new compositions of matter are surface modified oxides of the gel type wherein hydrogen atoms of the hydroxyl groups of the original gel structure have been replaced by —$BX_2$ radicals in which X is selected from the group consisting of hydrogen atoms and hydroxyl radicals and dehydrated surface modified oxides of the gel type wherein hydrogen atoms and hydroxyl radicals of the above-described modified gel structure have been removed as water.

The surface modified oxides of my invention can be prepared from any of many various gel materials which contain chemically combined or bound water which exists in the form of hydroxyl ions the majority of which are present in the surface of the gel material. Synthetic silica, alumina and magnesia gels, or gels prepared from any combination of these, for example, silica-alumina, alumina-magnesia or silica-alumina-magnesia gels, as well as natural clays, can be modified in accordance with my process to produce my new products. Such surface modified oxides or gels have a great variety of uses, for example, they may be used as adsorbents for gases, liquids and solids from various mixtures, and they may be used with particular advantage as catalysts and/or catalyst carriers, for example, in the treatment and synthesis of petroleum and hydrocarbon materials. They may be employed as adsorbents and as catalysts and/or catalyst carriers in the many ways that the unmodified gels are used. The wide use of many types of synthetic gels as catalysts and/or catalyst carriers in the oil industry presents a large field of use for my surface modified oxides or gels.

My process for producing my surface modified oxides is particularly advantageous and my surface modified oxides are particularly desirable because the boron is placed just on the surface of the treated gel which is the only catalytically effective part of the gel.

In preparing my surface modified oxides of the gel type, any adsorbed water present in the gel to be modified is first removed by suitable treatment, such as, by heating, by evacuating, by desiccating with $P_2O_5$, or by a suitable combination of these separate methods of treatment. Temperatures of 100° to 150° C. may be employed to remove the adsorbed water and 10 to 15 minutes at a temperature within this range should be sufficient to remove all adsorbed water. A temperature of 150° C. and a heating time of 10 to 15 minutes in vacuo will ensure that all adsorbed water has been completely removed from any gel.

When employing heating to remove adsorbed water from the gel, the use of temperatures higher than 150° C. will result in driving off some of the bound water. If it is desired to reduce the hydroxyl ion content of the gel and thereby the ultimate content of chemically bound boron in the final surface modified product, temperatures above 150° C. may be employed in this preliminary treatment of the gel. All of the bound water of a gel will not be driven off until very high temperatures are reached, i. e., temperatures of the order of about 1050° C.

Table I shows the percent of bound water in a silica gel which was thermally aged at the various temperatures indicated and also shows the percent of the total contained hydroxyl ions that is present in the surface of the gel as determined by the hydrogen evolved when the gel was exposed to diborane gas to the point of saturation. The heating periods for the several temperatures were approximately 4 to 7 hours to insure equilibrium conditions. Shorter times probably would have been sufficient to achieve the indicated percent of bound water for each particular temperature

TABLE I

| Aging temp., ° C. | Percent $H_2O$ by thermal analysis (dry basis) | Wt. sample (dry basis), g. | Cc. $^aH_2$ calcd. as OH content (x) | Cc. $^aH_2$ from $B_2H_6$ exposure (y) | Percent OH in surface, y/x |
|---|---|---|---|---|---|
| 155 | 4.92 | 0.3686 | 45.14 | 32.92 | 73.0 |
| 370 | 2.24 | .5308 | 29.59 | 25.49 | 86.1 |
| 500 | 1.31 | .5773 | 18.82 | 18.18 | 96.6 |
| 750 | 0.3 | .4607 | 3.44 | 3.42 | 99+ |

$^a$ At 0 and 760 mm.

As is evident from the above table, it is possible to control the amount of hydroxyl ions present in the surface of the gel to be modified by subsequent treatment with diborane by varying the heating temperature in the preliminary treatment of the gel. By this means it is possible to control the amount of boron, in the form of partially hydrolyzed borine, that will be chemically combined with the gel through the hydrolysis reaction between borine and hydroxyl ions. Therefore, it is possible to control the amount of chemically combined boron that will be present in a final modified product in which all the hydroxyl ions have entered into reaction with the borine supplied by the diborane.

After the preliminary treatment of the gel to remove at least all the adsorbed water has been completed, the gel now containing only bound water is exposed to diborane gas. It should be noted by way of precaution that since diborane is highly reactive with air or water, all handling of diborane should be carried out in high vacuum apparatus or at least under conditions excluding both air and water. The treatment of the gel with diborane may be carried out over a wide range of temperature. The diborane dissociates to borine and the borine reacts with the hydroxyl group of the bound water of the gel and becomes partially hydrolyzed. The hydrolysis of the partially hydrolyzed borine may be completed by contact with an excess of water vapor.

It has been established that varying the grain size of a particular gel does not alter the specific surface, porosity, or water content of the gel. Therefore, my process is applicable to gels in whatever particle size they may be used. The actual amount of bound water in a particular gel will depend on the method of preparation of the original gel plus the method used in the preliminary treatment of the gel to remove adsorbed water prior to the exposure of the gel to diborane.

The process of my invention to produce surface modified oxides or gels as new products may be illustrated as follows:

The recognized structural formula for silica containing only bound water is:

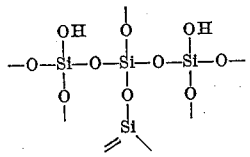

The reaction of this silica with diborane is as follows:

(A)
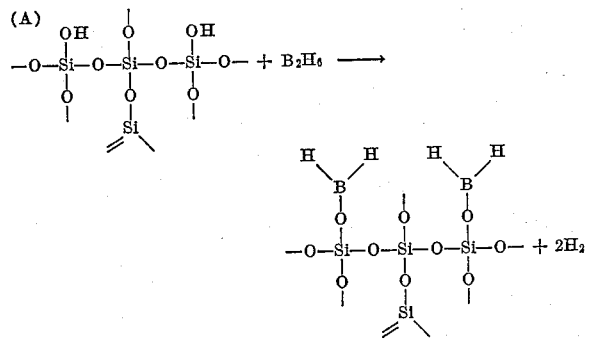

The reaction of the partially hydrolyzed borine ions with water is as follows:

(B)
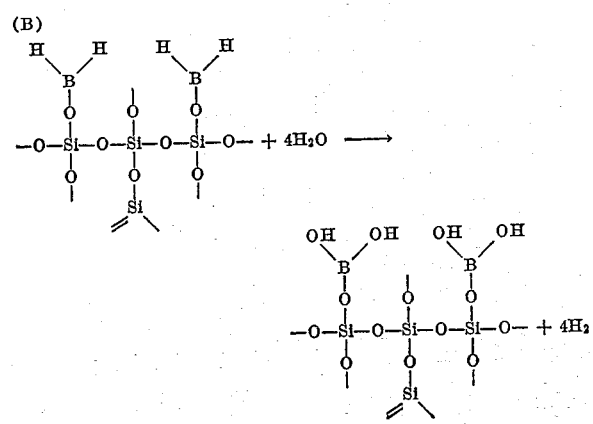

The validity of these reactions can be established by measuring the relative ratios of bound water, diborane, and hydrogen involved. In the presence of free water it is well recognized that the following reaction occurs:

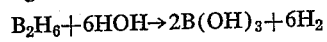

$$B_2H_6 + 6HOH \rightarrow 2B(OH)_3 + 6H_2$$

This reaction indicates a ratio of 6 molecules of hydrogen evolved per molecule of diborane consumed. There is also a ratio of 6 molecules of water to each molecule of diborane. In conducting a reaction according to Equation A, it was found that the actual ratio of hydrogen to diborane was approximately 2 indicating that only 2 of the 6 hydrogen atoms of the diborane were consumed. In a specific reaction (Example I) conducted according to Equation A, 0.5773 gram of a silica gel (dry basis) containing 1.31% bound water (by thermal analysis) was exposed to an excess of diborane gas and therefore should have yielded 18.82 cc. of hydrogen according to Equation A. Actually, 18.18 cc. of hydrogen were evolved. When this product of Equation A was exposed to an excess of water vapor, additional hydrogen was evolved in accordance with Equation B. The total amount of hydrogen evolved from the reactions according to Equation A and B brought the ratio of total hydrogen to diborane from these two reactions to 6:1 thus indicating that the remaining 4 hydrogens of the diborane were hydrolyzed in accordance with Equation B to give the products of that equation.

The following examples will further illustrate my new process for producing my new products:

*Example I*

A sample of silica (0.5773 gram—dry basis) was heated to above 100° C. in vacuo for 10 to 15 minutes to drive off all adsorbed water. After this heating period, the silica contained only bound water and contained 1.31% bound water. This sample was then exposed to an excess of diborane gas at 50° C. for several hours. Then the excess diborane was pumped off leaving the boron compound produced by the partial hydrolysis of the borine by which hydrogen atoms of hydroxyl groups of the original gel structure are replaced by —BH₂ radicals.

The hydrolysis of the borine was completed by exposing the product of the diborane exposure step to excess water vapor.

*Example II*

Samples of silica gel of known weight and in the form of gel grains having an average diameter of 64µ, which previously had been heated to 150° C. in vacuo to ensure complete removal of adsorbed water, were exposed to diborane gas at either —23° C. or 50° C. in standard high-vacuum apparatus. After various periods of exposure time, the hydrogen generated in the reaction was separated from the unused diborane by condensing the latter with liquid nitrogen, and then both gases were measured in a gas buret to determine the amount of diborane consumed and the amount of hydrogen evolved. In cases where it was desired to saturate the silica surface with diborane, the above exposure procedure was repeated until hydrogen no longer was generated.

In the samples of silica gel exosed to diborane gas at —23° C., the ratio of hydrogen evolved to diborane consumed was 2:1. Heating this gel to higher temperatures results in the evolution of additional hydrogen. The following ratios of total hydrogen evolved to diborane consumed at progressively increasing temperatures were obtained: 0° C., 2.20:1; 25° C., 3.12:1; 60° C., 3.74:1; 104° C., 3.96:1; 135° C., 4.36:1; 425° C., 6.07:1; and 490° C., 6.07:1.

The samples of silica gel exposed to diborane gas at 50° C. showed a ratio of hydrogen evolved to diborane consumed of about 2.8:1. These samples of silica were completely saturated with diborane, i. e., by repeated exposure of the gel samples to diborane until essentially no more hydrogen was evolved which indicated that there had been complete reaction of the available hydroxyl ions of the bound water. The point of such complete saturation was reached after a period of 60–70 hours. However, it was 90% complete in about 25 hours, 80% complete in about 10 hours and 75% complete in about 7 hours. In addition, the prolonged time of exposure was made necessary because there was no circulation of gases. If the diborane were circulated through the mass of gel, the necessary exposure time would be greatly reduced.

As indicated in Example II, heating a gel after it has been exposed to diborane results in the evolution of additional hydrogen. The actual quantity of hydrogen evolved is a function of the heating temperature but at any particular heating temperature the bulk of the hydrogen that will be evolved is evolved within a comparatively short time, about 3–6 hours, and then the rate of hydrogen evolution decreases.

This evolution of hydrogen, especially at lower temperatures, is attributed to a continuing hydrolysis of the borine groups by surface diffusion rather than thermal decomposition of the borine groups. This is particularly true if the surface of the gel has not been saturated with diborane. Even in cases where the surface of the gel has been saturated with diborane, there is some bound water in the gel which is not accessible to the diborane at the temperature at which saturation is effected. At higher temperatures this bound water is available for the hydrolysis reaction. Of course, in comparing a gel that has been saturated with diborane and one that has not been saturated at the original treating temperature, there is a difference at higher temperatures in the ease of availability of the remaining bound water for further hydrolysis of the borine groups. This difference in ease of availability of the remaining bound water can be attributed to the difference between surface diffusion and bulk diffusion of the bound water.

The use of the higher temperatures to effect further hydrolysis by making available additional hydroxyl groups for reaction with the borine groups may result in some cross-linking of two hydroxyl oxygens by a boron atom, thus:

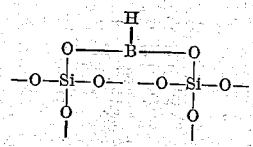

Such cross-linking may taken place within a molecule or between molecules of the gel. The increase in temperature must result in a migration of surface molecules so that further hydrolysis of the borine can take place and produce such cross-linking. Cross-linking probably does not occur at the lower temperatures for the reason that the silicon atoms serve as anchor points to prevent further migration of the partially hydrolyzed borine groups which become attached to the silicon atoms through the hydroxyl oxygens as a result of the initial partial hydrolysis.

If, after exposure to diborane and before or after effecting a partial or full completion of the hydrolysis of the borine groups, a diborane modified gel initially containing only bound water is heated to a relatively high temperature of the order of about 500° to 1000° C. or above, e. g., the temperatures customarily employed in calcining gels, the diborane modified gels of my invention will be further modified to a dehydrated form by the removal of water formed from hydrogen atoms and hydroxyl radicals of the modified gel structure. For example, the products of Examples I and II, both those produced by the initial exposure of the silica gel to diborane and those in which the hydrolysis of the borine groups has been carried further either by heating or exposing to free water can be heated to a temperature within the range of about 500° to 1000° C. and maintained at this temperature for about ½ hour to effect the formation and removal of water from the diborane modified silica gel. The heating time will, of course, vary considerably depending on the extent of dehydration sought. Under these conditions, some of the boron of the borine groups may assume the form of boron oxide in which the boron atom remains attached to the oxygen of the gel, e. g., O=B—O—Si≡. Cross-linking may develop both between molecules and within molecules of the gel by the occurrence of boron to boron linkages, boron to oxygen to boron linkages, boron to silicon linkages, and boron to oxygen to silicon linkages occasioned by the several ways in which the formation of a particular molecule of water might be effected, and this cross-linking would be in addition to any cross-linking of two hydroxyl oxygens by a boron atom occurring during the more moderate heating of a diborane modified gel to effect further hydrolysis of the partially hydrolyzed borine groups. In addition, heating at these relatively high temperatures may cause some of the borine groups to be split away from the molecule of the gel to form free boron oxide. Other modifications of the diborane modified gel may occur when the gel is heated to such a relatively high temperature to effect dehydration.

While I have described my new process and the new products resulting from that process without reference to many of the possible prior or subsequent modifications of the gels either by physical treatment or by treatment with other materials, it will be understood from my disclosure that my invention involves the reaction between the hydroxyl ions of the bound water of the gels and the borine groups provided by the diborane. Therefore, modification according to my process may be followed by a further modification of the products of my process by physical treatment or by treatment with other materials, or the gels may be first modified in some other way which does not affect the hydroxyl ions of the bound water of the gels or at least does not effect a complete removal of such hydroxyl ions so that such modification of the gels may be followed by a treatment with biborane in accordance with my process.

My copending application Serial No. 407,148, filed January 29, 1954, is directed to modified oxides of the gel type and a process for producing such modified products which involves contacting a gel containing adsorbed water with diborane.

I claim:

1. As new compositions of matter, surface modified oxides of the class consisting of at least one of silica, alumina, and magnesia gels containing chemically combined boron in the surface structure of the gel wherein hydrogen atoms of hydroxyl groups of the original gel structure have been replaced by —BX₂ radicals in which X is selected from the group consisting of hydrogen atoms and hydroxyl radicals.

2. As new compositions of matter, dehydrated surface modified oxides of the class consisting of at least one of silica, alumina, and magnesia gels containing chemically combined boron in the surface structure of the gel wherein hydrogen atoms of hydroxyl groups of the original gel structure have been replaced by —BX₂ radicals in which X is selected from the group consisting of hydrogen atoms and hydroxyl radicals and wherein hydrogen atoms and hydroxyl radicals of the modified gel structure have been removed as water.

3. As new compositions of matter, surface modified silica gel containing chemically combined boron in the surface structure of the gel wherein hydrogen atoms of hydroxyl groups of the original gel structure have been replaced by —BX₂ radicals in which X is selected from the group consisting of hydrogen atoms and hydroxyl radicals.

4. As new compositions of matter, dehydrated surface modified silica gel containing chemically combined boron in the surface structure of the gel wherein hydrogen atoms of hydroxyl groups of the original gel structure have been replaced by $-BX_2$ radicals in which X is selected from the group consisting of hydrogen atoms and hydroxyl radicals and wherein hydrogen atoms and hydroxyl radicals of the modified gel structure have been removed as water.

5. As new compositions of matter, surface modified silica gel having the general formula

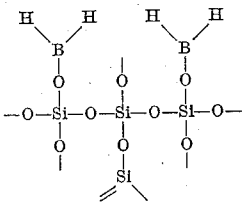

6. A new compositions of matter, surface modified silica gel having the general formula

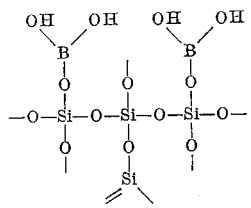

7. The process for producing surface modified oxides of the class consisting of at least one of silica, alumina, and magnesia gels which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then treating the surface modified oxide to effect further hydrolysis to convert at least a portion of the $-BH_2$ radicals to $-B(OH)_2$ radicals.

8. The process for producing surface modified oxides of the class consisting of at least one of silica, alumina, and magnesia gels which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then heating the surface modified oxide to effect further hydrolysis to convert at least a portion of the $-BH_2$ radicals to $-B(OH)_2$ radicals.

9. The process for producing surface modified oxides of the class consisting of at least one of silica, alumina, and magnesia gels which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then exposing the surface modified oxide to water vapor to effect further hydrolysis to convert at least a portion of the $-BH_2$ radicals to $-B(OH)_2$ radicals.

10. The process for producing dehydrated surface modified oxides of the class consisting of at least one of silica, alumina, and magnesia gels which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, treating the surface modified oxide to effect further hydrolysis to convert at least a portion of the $-BH_2$ radicals to $-B(OH)_2$ radicals, and then heating the surface modified oxide to a temperature of the order of about 500° to 1000° C. to effect dehydration by removing hydrogen atoms and hydroxyl radicals of the modified gel structure as water.

11. The process for producing surface modified silica gel which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then treating the surface modified silica gel to effect further hydrolysis to convert at least a portion of the $-BH_2$ radicals to $-B(OH)_2$ radicals.

12. The process for producing surface modified silica gel which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then heating the surface modified silica gel to effect further hydrolysis to convert at least a portion of the $-BH_2$ radicals to $-B(OH)_2$ radicals.

13. The process for producing surface modified silica gel which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, and then exposing the surface modified silica gel to water vapor to effect further hydrolysis to convert at least a portion of the $-BH_2$ radicals to $-B(OH)_2$ radicals.

14. The process for producing dehydrated surface modified silica gel which comprises treating the gel to remove all adsorbed water, thereafter contacting the gel containing only bound water with gaseous diborane in an amount and for a time sufficient to replace hydrogen atoms of hydroxyl groups of the original gel structure by $-BH_2$ radicals, treating the surface modified silica gel to effect further hydrolysis to convert at least a portion of the $-BH_2$ radicals to $-B(OH)_2$ radicals, and then heating the surface modified silica gel to a temperature of the order of about 500° to about 1000° C. to effect dehydration by removing hydrogen atoms and hydroxyl radicals of the modified gel structure as water.

References Cited in the file of this patent

UNITED STATES PATENTS

| | | |
|---|---|---|
| 2,504,001 | Connolly | Apr. 11, 1950 |
| 2,584,405 | West | Feb. 5, 1952 |
| 2,680,696 | Broge | Jan. 8, 1954 |
| 2,731,453 | Field et al. | Jan. 17, 1956 |
| 2,736,669 | Goebel | Feb. 28, 1956 |

OTHER REFERENCES

Shapiro et al.: "Bound Water in Silica Gel," in "The Journal of Physical Chemistry," vol. 57, No. 2, February 1953, pages 219 to 221 inclusive.